(12) United States Patent
Chen

(10) Patent No.: US 6,761,320 B1
(45) Date of Patent: Jul. 13, 2004

(54) CONNECTOR STRUCTURE FOR MULTI-STORAGE MEDIA

(75) Inventor: Yuan-Hua Chen, Taoyuan Hsien (TW)

(73) Assignee: Kingconn Technology Co., Ltd., Taoyuan Hsien (TW)

( * ) Notice: Subject to any disclaimer, the term of this patent is extended or adjusted under 35 U.S.C. 154(b) by 0 days.

(21) Appl. No.: 10/412,211

(22) Filed: Apr. 14, 2003

(30) Foreign Application Priority Data

Mar. 3, 2003 (TW) ..................................... 92203172 U

(51) Int. Cl.⁷ .......................... G06K 19/06; H01R 24/00
(52) U.S. Cl. ........................... 235/492; 439/61; 439/946
(58) Field of Search ........................... 235/492; 439/61, 439/630, 631, 946

(56) References Cited

U.S. PATENT DOCUMENTS

| | | | | |
|---|---|---|---|---|
| 5,766,033 A | * | 6/1998 | Davis | ......................... 439/405 |
| 6,338,635 B1 | * | 1/2002 | Lee | ............................. 439/108 |
| 6,471,550 B2 | * | 10/2002 | Maiterth et al. | ............ 439/631 |
| 6,540,523 B1 | * | 4/2003 | Kung et al. | .................... 439/64 |
| 6,648,697 B2 | * | 11/2003 | Yang | ......................... 439/701 |
| 6,672,904 B1 | * | 1/2004 | Chen | ......................... 439/631 |
| 6,692,305 B2 | * | 2/2004 | Nelson et al. | .............. 439/608 |

* cited by examiner

Primary Examiner—Daniel A Hess
(74) Attorney, Agent, or Firm—Troxell Law Office PLLC

(57) ABSTRACT

A connector structure for multi-storage media is constructed to include an insulating housing defining an insertion slot for receiving one of a set of memory cards, comprising: a plurality of first terminals; a plurality of second terminals; a plurality of third terminals; and a plurality of fourth terminals; thereby, when inserting a memory card into the insertion slot from the front side of the housing, a plurality of contacts of the memory card can contact with the first terminals, second terminals, third terminals or fourth terminals respectively for accessing the memory card. Wherein the memory card can be a xD card, a SD/MMC card, a Smart Media card or a MS card.

10 Claims, 3 Drawing Sheets

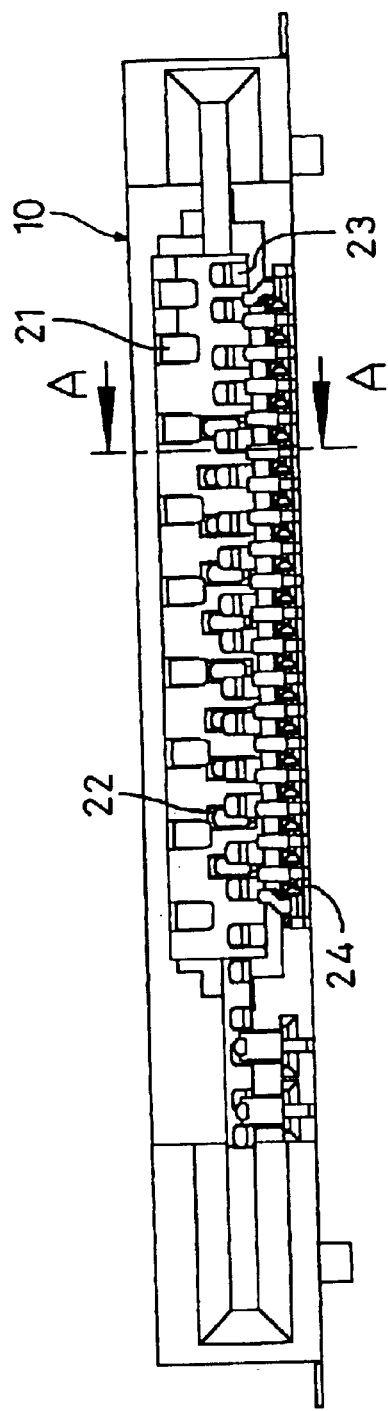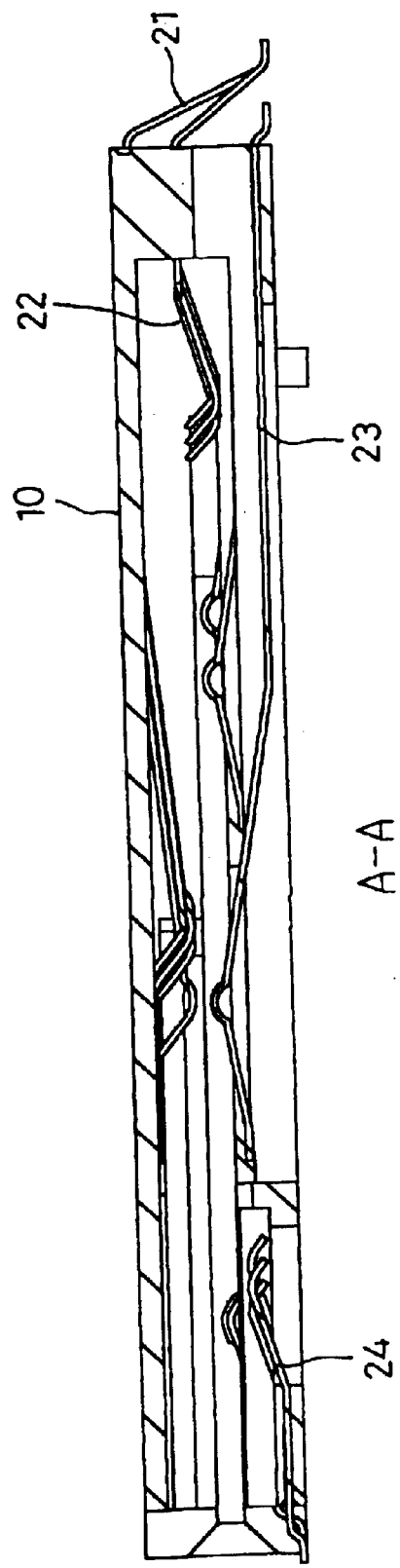

CONNECTOR STRUCTURE FOR MULTI-STORAGE MEDIA

BACKGROUND OF THE INVENTION

1. Field of the Invention

The present invention relates to a memory card connector and, more particularly, to a connector structure for multi-storage media, which has an inserting slot in the open side of the housing for receiving any of a variety of memory cards such as xD card, MS card, SM card, SD card, or MMC card.

2. Description of the Related Art

Flash memory brings convenience to information industries for storage of data. For single, independent, or temporary data storage, flash memory eliminates the necessity of installing a big capacity of main memory. By means of the use of a single piece of flash memory, the storage and file management of particular data becomes easy.

Memory cards for use in consumer electronic products such as digital cameras, digital video cameras, MP3 players, PDAs, etc., include MMC cards (Multi-Media Cards), SD cards (Secure Digital Cards), SM cards (Smart Media Cards), CF cards (Compact Flash cards Type I and Type), and xD cards developed by Olympus and Fuji. The difference between a SD card and a MMC card is the number of pins. These two cards use the same slot in a read write apparatus. The storage capacity of an xD card can be expanded to several BGB, meeting user's requirement for image processing. However, it is regrettable that conventional read write apparatus cannot read an xD card.

Commercially available read write apparatus commonly have only one slot for the loading of a particular model of memory card, or one of a few models of memory cards. For reading a different model of memory card, the user may have to change the read write apparatus. In order to eliminate this problem, read write apparatus capable of reading different memory cards are developed. However, these multipurpose read write apparatus have at least one slot in the front open side for receiving different memory cards, but the slot of the multipurpose read write apparatus cannot access the xD card at present.

SUMMARY OF THE INVENTION

The present invention has been accomplished under the circumstances in view. According to one aspect of the present invention, the connector structure for multi-storage media has an insertion slot and four sets of terminals respectively suspended in the insertion slot at different locations for the connection of one of a set of memory cards including xD card, MS card, SM card, SD card, or MMC card.

According to another aspect of the present invention, the terminals each have a respective solder end extended out of the bottom side of the housing for soldering to a printed circuit board through surface mounting technique.

BRIEF DESCRIPTION OF THE DRAWINGS

The present invention can be more fully understood by reference to the following detailed description and accompanying drawings, in which:

FIG. 3(a) is a front view of the connector structure for multi-storage media according to the present invention; and FIG. 3(b) is a sectional view of the connector structure for multi-storage media according to the present invention.

DETAILED DESCRIPTION OF THE PREFERRED EMBODIMENT

Figure 1:
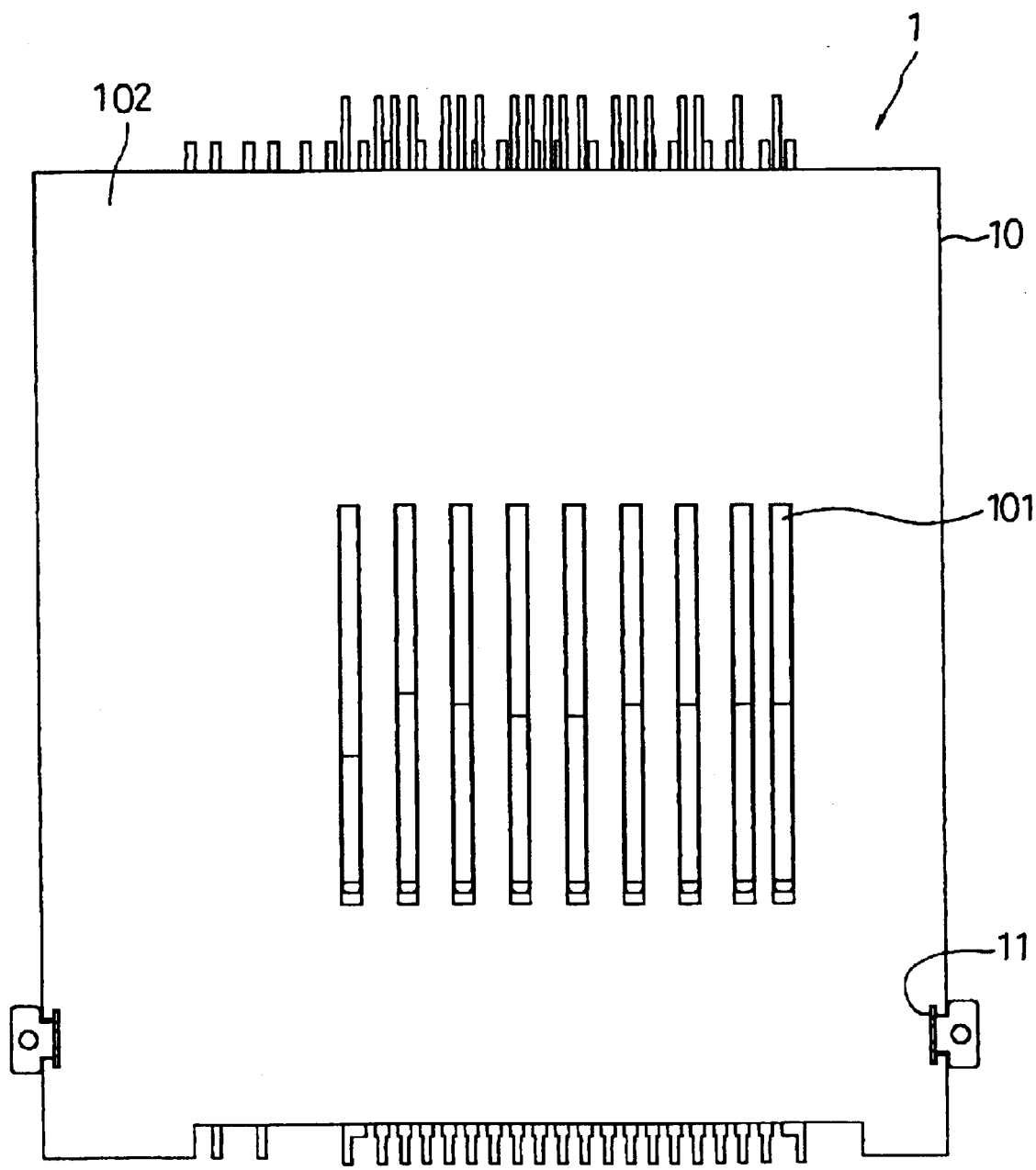
FIG. 1 is an assembly view of a connector structure for multi-storage media according to the present invention.
Figure 2:
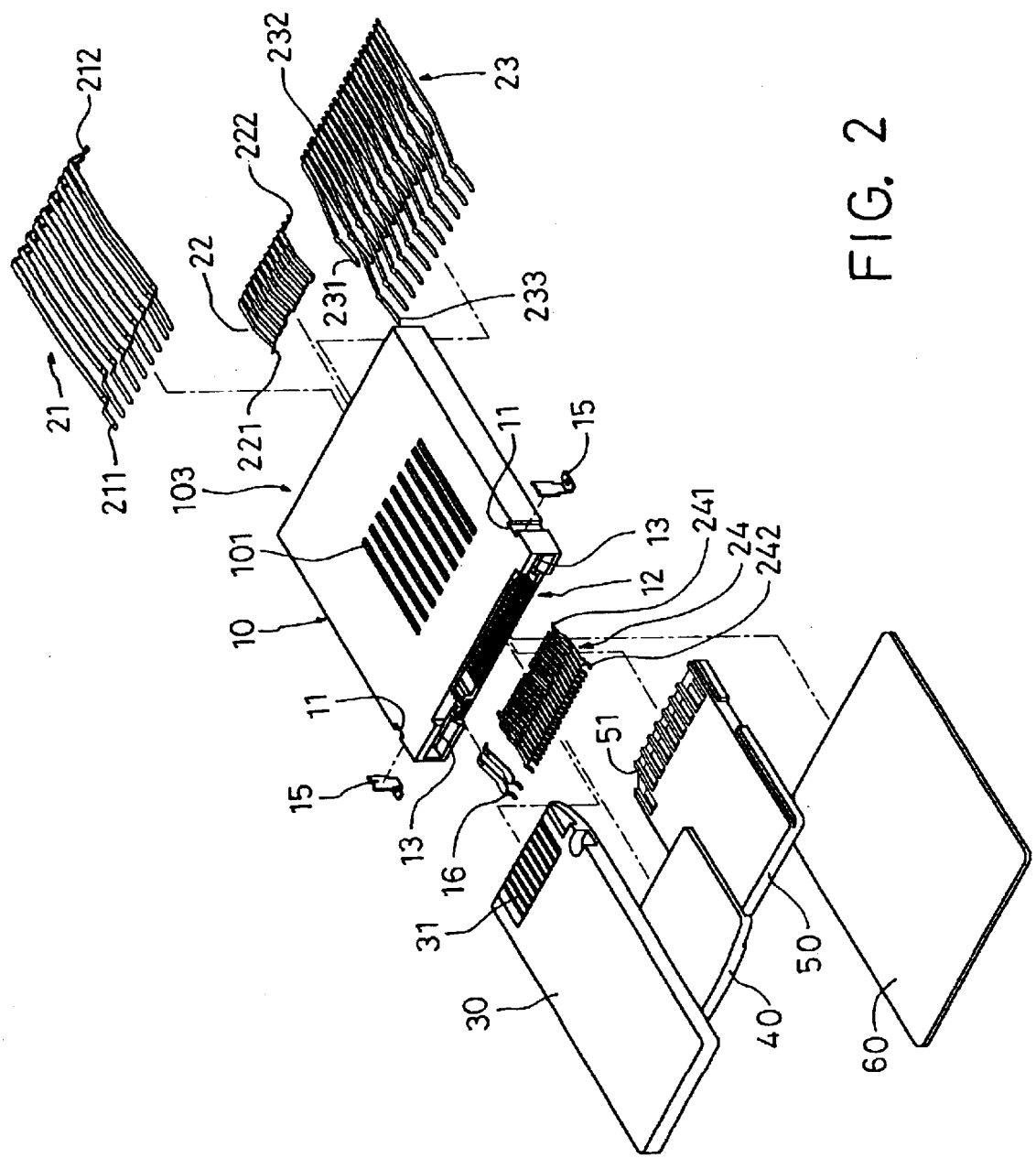
FIG. 2 is an exploded view of the connector structure for multi-storage media according to the present invention.

Referring to FIGS. 1~2, a connector structure for multi-storage media is shown comprised of a housing 10, a plurality of first terminals 21, a plurality of second terminals 22, a plurality of third terminals 23 and a plurality of fourth terminals 24.

Wherein, the housing 10 is made of electrically insulating material, having an insertion slot 12 horizontally inwardly extended from the front side of the housing 10. The insertion slot 12 is made subject to the sizes and shapes of different memory cards such as xD card, MS card, SM card, SD card, or MMC card. The top surface 102 of the housing 10 having a plurality of openings 101 and both sides of the housing 10 respectively having a mounting hole 11, and a mounting plate 15 can be positioned in the mounting hole 11 for fastening on a print circuit board by using Surface Mounted Technology (SMT). The first terminals 21, have a shape of curve, each first end 211 of the first terminals inserted 21 into the insertion slot 12 and extended into the openings 101 from the back end of the housing 10, and each second end 212 of the first terminals 21 extended out of the back end of the housing 10 for mounting; wherein, the first terminals 21 are contacting with the contacts of the SD/MMC memory card 50 preferably.

The second terminals 22, also have a shape of curve, each first end 221 of the second terminals 22 inserted into the insertion slot 12 and located down the first terminals 21 from the back end of the housing 10, and each second end 222 of the second terminals 22 extended out of the back end of the housing 10 for mounting and intersected with the first terminals 21; wherein, the second terminals 22 are contacting with the contacts of the MS memory card 30 preferably.

The third terminals 23, also have a shape of curve, each first end 231 of the third terminals 23 inserted into the insertion slot 12 and located down the second terminals 22 from the back end of the housing 10, and each second end 232 of the third terminals 23 extended out of the back end of the housing 10 for mounting, and the second end 232 of the third terminals 23 being shorter than the second end 222 of the first and second terminals 22, wherein, at least one terminal 233 of the third terminals 23 is longer than other terminals 231 and the third terminals 23 are contacting with the contacts of the SM memory card 60 preferably.

The fourth terminals 24, each first end 241 of the fourth terminals 24 is inserted into the insertion slot 12 from the front side of the housing 10 and closed to the longer third terminals 233, and each second end 242 of the fourth terminals 24 extended out of the front side of the housing 10 for mounting; wherein, the fourth terminals 24 are contacting with the contacts of the xD memory card 40 preferably. Thereby, when inserting a memory card into the insertion slot 12 from the front side of the housing 10, a plurality of contacts of the memory card (such as MS memory card 30, xD memory card 40, SD/MMC memory card 50, or SM memory card 60) can contact with the first terminals 21, second terminals 22, third terminals 23 or fourth terminals 24 respectively for accessing the memory card.

Referring to FIG. 2 shows an exploded view of the connector structure for multi-storage media according to the present invention. As shown in FIG. 2, the connector structure for multi-storage media is shown comprised of a housing 10, a plurality of first terminals 21, a plurality of second terminals 22, a plurality of third terminals 23 and a plurality of fourth terminals 24. Wherein, the first terminals 21 are located at the most top position of the housing 10; the second terminals 22 are located below the first terminals 21 and each second end 222 of the second terminals 22 extended out of the back end of the housing 10 for mounting and intersected with the first terminals 21; the third terminals 23 are located below the second terminals 22, and at least one terminal 233 of the third terminals 23 is longer than other terminals 231 obviously; the fourth terminals 24, each first end 241 of the fourth terminals 24 is inserted into the insertion slot 12 from the front side of the housing 10 and closed to the longer third terminals 233, and another end 242 of the fourth terminals 24 are extended out of the front side of the housing 10 for mounting. Besides, the connector structure 1 further comprises a write protection device 16 installed in the housing 10 at one side of the fourth terminals 24 for preventing data being written into the Smart Media memory card 60, wherein the write protection device 16 further comprises a plurality of fifth terminals.

Referring to FIG. 3(a) shows a front view of the connector structure for multi-storage media according to the present invention. As shown in FIG. 3(a), the first terminals 21 are located at the most top position of the housing 10; the second terminals 22 are located below the first terminals 21; and the third terminals 23 are located below the second terminals 22. The spaces 13 located at both sides of the insertion slot 12 provide a wider space for inserting the larger Smart Media memory card 60.

Referring to FIG. 3(b) shows a section view of the connector structure for multi-storage media according to the present invention. As shown in FIG. 3(b), we can see the locations of the first terminals 21, the second terminals 22, the third terminals 23 and the fourth terminals 24 clearly. Wherein, the first end 241 of the fourth terminals 24 are inserted into the insertion slot 12 from the front side of the housing 10 and closed to the longer third terminals 233, and another end 242 of the fourth terminals 24 are extended out of the front side of the housing 10 for mounting. The second end 212 of the first terminals 21 and the second end 222 of the second terminals 22 are both extended out of the back end of the housing 10 for mounting and intersected each other. The second end 232 of the third terminals 23 are shorter than the second end 212 of the first terminals 21 and the second end 222 of the second terminals 22.

As indicated above, the housing 10 needs only one insertion slot 12 to receive one of a set of different memory cards such as xD card, SM card, MS card, SD card, and MMC card. The arrangement of the write protection device 16 detects the insertion of a SD card and its write protection status.

Although a particular embodiment of the invention has been described in detail for purposes of illustration, various modifications and enhancements may be made without departing from the spirit and scope of the invention. Accordingly, the invention is not limited except as by the appended claims.

What is claimed is:

1. A connector structure for multi-storage media comprising:
    a housing, having an insertion slot for holding a memory card, and a top surface of said housing has a plurality of openings;
    a plurality of first terminals, having a shape of curve, each first end of said first terminals inserted into said insertion slot and extended into said openings from the back end of said housing, and each second end of said first terminals extended out of said back end of said housing for mounting;
    a plurality of second terminals, also having a shape of curve, each first end of said second terminals inserted into said insertion slot and located down said first terminals from said back end of said housing, and each second end of said second terminals extended out of said back end of said housing for mounting and intersected with said first terminals;
    a plurality of third terminals, also having a shape of curve, each first end of said third terminals inserted into said insertion slot and located down said second terminals from said back end of said housing, and each second end of said third terminals extended out of said back end of said housing for mounting, and the second end of said third terminals being shorter than the second end of said first and second terminals, wherein, at least one terminal of said third terminals is longer than other terminals; and
    a plurality of fourth terminals, each first end of said fourth terminals inserted into said insertion slot from the front side of said housing and closed to said longer third terminals, and each second end of said fourth terminals extended out of said front side of said housing for mounting;
    thereby, when inserting a memory card into said insertion slot from the front side of said housing, a plurality of contacts of said memory card can contact with said first terminals, second terminals, third terminals or fourth terminals respectively for accessing said memory card.

2. The connector structure for multi-storage media as claimed in claim 1, wherein said memory card can be a xD card, a SD/MMC card, a Smart Media card or a MS card.

3. The connector structure for multi-storage media as claimed in claim 1, wherein said first terminals are contacting with said contacts of said SD/MMC memory card.

4. The connector structure for multi-storage media as claimed in claim 1, wherein said second terminals are contacting with said contacts of said MS memory card.

5. The connector structure for multi-storage media as claimed in claim 1, wherein said third terminals are contacting with said contacts of said Smart Media memory card.

6. The connector structure for multi-storage media as claimed in claim 1, wherein said fourth terminals are contacting with said contacts of said xD memory card.

7. The connector structure for multi-storage media as claimed in claim 1, wherein both sides of said housing further comprises a mounting hole respectively.

8. The connector structure for multi-storage media as claimed in claim 7, wherein said connector further comprises a mounting plate positioned in said mounting hole for fastening.

9. The connector structure for multi-storage media as claimed in claim 1, further comprises a write protection device installed in said housing at one side of said fourth terminals for preventing data being written into said Smart Media memory card.

10. The connector structure for multi-storage media as claimed in claim 9, wherein said write protection device further comprises a,plurality of fifth terminals.

* * * * *